United States Patent [19]
Mills

[11] Patent Number: 5,991,405
[45] Date of Patent: Nov. 23, 1999

[54] METHOD FOR DYNAMICALLY UPDATING CELLULAR PHONE UNIQUE ENCRYPTION KEYS

[75] Inventor: Kevin M. Mills, Austin, Tex.

[73] Assignee: DSC Telecom, L.P., Plano, Tex.

[21] Appl. No.: 09/014,121

[22] Filed: Jan. 27, 1998

[51] Int. Cl.[6] .................................................. H04L 9/32
[52] U.S. Cl. .............................. 380/21; 380/23; 455/411
[58] Field of Search ................................. 380/21, 23, 25, 380/44, 49, 48; 455/410, 411, 433

[56] References Cited

U.S. PATENT DOCUMENTS

| | | |
|---|---|---|
| 5,123,047 | 6/1992 | Rosenow . |
| 5,146,498 | 9/1992 | Smith ......................................... 380/21 |
| 5,204,902 | 4/1993 | Reeds, III et al. ........................ 380/23 |
| 5,325,432 | 6/1994 | Gardeck et al. . |
| 5,375,169 | 12/1994 | Seheidt et al. ............................ 380/21 |
| 5,404,404 | 4/1995 | Novorita . |
| 5,490,201 | 2/1996 | Moberg et al. . |
| 5,499,297 | 3/1996 | Boebert . |
| 5,513,245 | 4/1996 | Mizikovsky .............................. 379/59 |
| 5,586,185 | 12/1996 | Shibata et al. . |
| 5,613,214 | 3/1997 | Shirasawa et al. ....................... 455/54 |
| 5,655,004 | 8/1997 | Holbrook . |
| 5,661,806 | 8/1997 | Nevoux et al. ........................... 380/25 |
| 5,680,457 | 10/1997 | Bestler et al. . |

*Primary Examiner*—Gilberto Barrón, Jr.
*Assistant Examiner*—Miles Horak
*Attorney, Agent, or Firm*—Kenyon & Kenyon

[57] ABSTRACT

In a method for dynamically updating a cellular-phone-unique-encryption key previously stored in, and common to, each of a cellular phone and an associated home location register (HLR) for providing security in a cellular-phone-network operation, a random number and shared secret random data generated at least partly based on the random number are transmitted and verified between the cellular phone and the associated HLR. A previously stored version of the cellular-phone-unique-encryption key is then dynamically updated in both the cellular phone and in the HLR by independent calculations based on an algorithm using the shared secret random data and the previously stored version of the cellular-phone-unique-encryption key. In this manner, the cellular-phone-unique-encryption key is dynamically updated as desired, e.g., each time a user initiates a call, and the latest version of the cellular-phone-unique-encryption key independently calculated by the cellular phone and the HLR is not transmitted during the updating process, thereby substantially eliminating the possibility of the latest version of the cellular-phone-unique-encryption key being intercepted during transmission by unauthorized parties.

26 Claims, 2 Drawing Sheets

METHOD FOR DYNAMICALLY UPDATING CELLULAR PHONE UNIQUE ENCRYPTION KEYS

FIELD OF THE INVENTION

The present invention relates to a method for dynamically updating encryption keys used to provide security for cellular phone operation, and more particularly, to a method for facilitating the independent calculations of a new encryption key for a cellular telephone network by both a cellular phone and an associated home location register.

BACKGROUND INFORMATION

The use of cellular phones for both personal and business related communication has become much more commonplace today. With the increase in use of cellular phones, theft of the encryption keys for the cellular phones has become more prevalent, so much so that cellular phone service providers have begun to look for methods to prevent encryption key theft and the resultant unauthorized cellular phone usage.

For example, U.S. Pat. No. 5,655,004, issued Aug. 5, 1997 to Holbrook, relates to a method and apparatus for the detection of cellular-phone fraud. To prevent fraud, a central processing facility allows communication service between a cellular phone and a recipient only upon proper authentication. Authentication is carried out using a request for service message sent by the cellular phone to the central processing facility. The request for service message includes both an identification code specific to the cellular phone and an authentication code which represents a cumulative total of the prior usage of the cellular phone. Based upon the identification code, the authentication code is compared by the central processing facility to a previously stored authentication code for the cellular phone. Communication between the cellular phone and the recipient is allowed only if the transmitted authentication code and the stored authentication code match within established tolerances. Update of the authentication code occurs at the end of communication to reflect the additional usage of the cellular phone. This method, however, may be subject to an ever increasing discrepancy between the cumulative usage authentication code in the cellular phone and the stored authentication code in the central processing facility. Further, it may be possible to intercept the data transmitted in the request for service message, monitor the length of the call, and use that data to fraudulently place a call at a later time.

Another example of an attempt to deter cellular-phone fraud is described in U.S. Pat. No. 5,490,201, issued Feb. 6, 1996 to Moberg et al. This patent relates to a method for updating a database of a home location register (HLR) with only minimal losses of processing capacity in the database of a visitor location register (VLR) in a GSM-type (i.e., Global System for Mobile communication) mobile telephone system. Updating of the HLR database is accomplished by sending a reset-message from the HLR to the VLR which identifies the HLR database to the VLR database. In response, the VLR database determines if any of the cellular phones with which it had radio contact belong to the HLR requesting an update. If such is the case, the VLR compares time point data of the radio contact with the cellular phone and if it was before the time point of the receipt of the reset-message, the VLR will send update data to the HLR. This method, however, relies on an intermediary between the HLR and the cellular phone which may be prone to error. For instance, the method must rely on the accuracy of the VLR database in determining proper ownership of the cellular phones and the proper recordation of time points of the radio contacts and the reset-message. Further, this method of data transmission is similarly subject to interception.

Yet another example, described in U.S. Pat. No. 5,404,404, issued Apr. 4, 1995 to Novorita, relates to a method for updating encryption key information in a communication unit. Updating is carried out when a key management controller transmits a key updating message, including an identification variable and a re-key session number, to a communication resource allocator. The communication resource allocator then transmits the key updating message to the communication unit. Upon receipt, the communication unit compares the identification variable to an internal identification variable. If the identification variables match, the communication unit then compares the received re-key session number to a re-key session number stored in memory. If the re-key session numbers do not match, the communication unit contacts the key-management controller to receive updated encryption key information. This method similarly suffers from the disadvantages of relying on the identification procedure being carried out correctly, as well as from the disadvantages of requiring an initial communication of the message by an intermediary. Also, the updated encryption key information is subject to interception during transmission.

Thus, as can be seen from the above examples, an improved method for dynamically updating cellular phone encryption keys is necessary.

SUMMARY OF THE INVENTION

It is an object of the present invention to provide a method for dynamically updating unique encryption keys which provide security for cellular phone operation, which method substantially prevents the possibility of stealing and/or decoding of the cellular phone encryption keys used in a cellular phone network, thereby preventing fraudulent use of cellular phones.

It is another object of the present invention to provide a method for dynamically updating cellular phone encryption keys without requiring transmission of the updated encryption keys between the cellular phone in use and an associated central processing facility or home location register (HLR) for verification.

It is yet another object of the present invention to provide a method for dynamically updating cellular phone encryption keys, which method allows for both the cellular phone and the associated home location register (HLR) to independently calculate the updated cellular phone encryption key.

It is yet another object of the present invention to provide an improved method for dynamically updating cellular phone encryption keys, which method requires no protocol change in the existing cellular telephone network.

To achieve the foregoing and further objectives, and in accordance with the purposes of the present invention, as embodied and broadly described herein, the present invention provides a method which allows both a cellular phone and an associated HLR to independently calculate, during any time period in which the cellular phone and the associated HLR are in communication with each other, and preferably each time a call is initiated using the cellular phone, an updated version of the cellular phone unique key, or encryption key, based on an algorithm using shared secret random data and a previously stored version of the cellular phone unique key. By using shared secret random data and the previously stored version of the encryption key, the method according to the present invention facilitates dynamic update of the cellular phone unique encryption key without requiring transmission of the updated encryption key between the cellular phone and the associated HLR during the dynamic update process, which transmission may otherwise be subject to interception.

Initiation of the dynamic update of the cellular phone unique encryption key by independent calculations in both the cellular phone and in the HLR can be accomplished by several means. Either the HLR or the cellular phone may initiate the update, or the user may physically bring the cellular phone in for updating (as is currently the practice). Further, the HLR and the cellular phone may use one or more of several factors or conditions as the basis for the initiation of the dynamic update. The means by which the dynamic update is initiated and the conditions used as the basis for the initiation are discussed further in detail below.

It should be understood that, at the time of initiation of the dynamic update process, both the cellular phone and the associated HLR have a previously stored version of the cellular phone unique encryption key. Upon initiation, the dynamic update of the cellular phone unique encryption key is accomplished in a series of steps. First, the new shared secret random data, which is used to calculate an updated version of the cellular phone encryption key, is calculated based on a number manipulating algorithm using a random number and the previously stored version of the encryption key. After this calculation, the new shared secret random data and the random number are sent between the HLR and the cellular phone. Which component of the cellular phone network sends the data and which receives the data is dependent upon which component initiated the dynamic update. Assuming, for instance, that the HLR initiated the dynamic update, the HLR calculates the shared secret random data and then transmits that data and the random number used in the calculation to the cellular phone. The receipt of the shared secret data and the random number are then acknowledged between the HLR and the cellular phone.

Next, the recipient of the shared secret random data and the random number recalculates the shared secret random data based on the previously-mentioned number manipulating algorithm using the received random number and the previously stored version of the encryption key. Thus, the shared secret random data is actually calculated independently by the cellular phone and the HLR on the basis of a number manipulating algorithm using the random variable and the previously stored version of the encryption key. Upon recalculation of the shared secret random data by the recipient, the recipient verifies that the recalculated shared secret random data and the received shared secret random data match. For instance, if the cellular phone received the shared secret random data from the HLR, the cellular phone will recalculate the shared secret random data and compare the recalculation result with the shared secret random data it has received. Upon successful verification of the shared secret random data, the recipient, in this case the cellular phone, sends an acknowledgment to the initiator of the dynamic update, i.e., the HLR, that the verification of the shared secret random data has been successful.

Upon acknowledgment that the shared secret random data has been verified by independent calculation, the component of the cellular phone network which initiated the dynamic update process then sends a command to the recipient to update the previously stored version of the encryption key. Dynamic update of the previously stored version of the encryption key is performed by calculation using the above-mentioned number manipulating algorithm, the shared secret random data and the stored original encryption key, and is carried out independently by each component, i.e., the HLR and the cellular phone. In this manner, the newly updated version of the encryption key which has been independently calculated is not transmitted between the HLR and the cellular phone during the dynamic update process, and the newly updated version of the encryption key is thus not subject to interception. The newly updated encryption key is then stored and used for the next authentication itself at a future point upon initiation of the dynamic update method of the present invention.

The present invention, including its features and advantages, will become more apparent from the following detailed description with reference to the accompanying drawings.

DETAILED DESCRIPTION OF THE INVENTION

In normal operation of a cellular phone, a user initiates a call by dialing the number of the recipient with whom the caller wishes to communicate. Upon dialing, the cellular phone transmits to an associated home location register (HLR) the recipient's number as well as authentication data based on an encryption key which is unique to the caller's cellular phone (encryption keys are also referred to herein as "cellular phone unique encryption keys," "cellular phone encryption keys" or "cellular phone unique keys"). The HLR uses the transmitted authentication data to authenticate that the caller's cellular phone is authorized to make the call. If the cellular phone is authenticated, the call is completed or allowed to continue. Of course, the authentication process may be carried out by any one of several known suitable means available using the unique encryption key and may be initiated by either component of the cellular telephone network.

Figure 1:
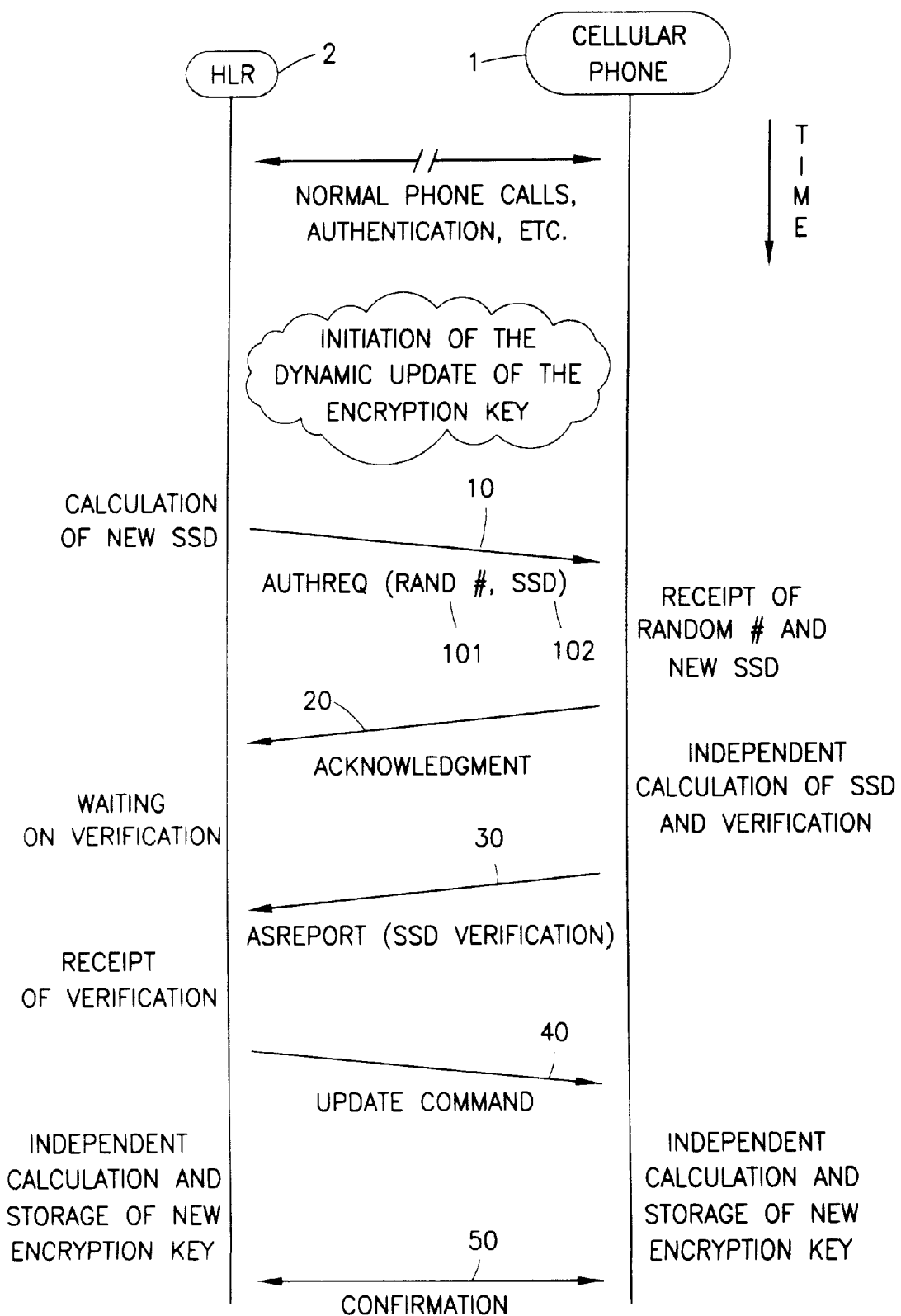
FIG. 1 is a schematic diagram illustrating the transmission of data messages between the HLR and cellular phone which occurs in an example, according to the present invention, of the dynamic update process which has been initiated by the HLR.

Referring to FIG. 1, the method for dynamically updating cellular phone unique keys used for encryption according to the present invention will be explained within the framework of the above-described normal operation of the cellular phone. It is to be understood that either component of the cellular telephone network (i.e., the cellular phone of the HLR) may initiate the dynamic update procedure, and either component may send and/or receive the data messages which are used in the dynamic update process and described below in detail. Furthermore, the dynamic update process may be initiated at any point during normal operation of a cellular phone. In addition, since the design and operation of the components of a cellular phone network, i.e., the cellular phone and the HLR, are well known, these will not be described in detail.

For the purposes of illustrating an example of the method according to the present invention, a cellular phone 1 and an associated HLR 2 are shown in FIG. 1 to be in communication with each other. It should be understood that, at the time of initiation of the dynamic update process, both the cellular phone and the associated HLR have a previously stored version of the cellular phone unique encryption key 1000. In this example, HLR 2 has determined that a dynamic update of the cellular phone encryption key is necessary. The decision to update the encryption key may be made on the basis of one or more of several factors or conditions. For example, a call count history may be kept so that the cellular phone unique key is updated every third call or at some other interval. Alternatively, the dynamic update process may be initiated if the cellular phone has failed to authenticate itself properly a number of times. The predetermined number of authentication failures which will trigger the initiation of the dynamic update process can be set at any number. Further, initiation of the dynamic update process may be manually controlled, either by the cellular phone user or by an employee at the HLR. As yet another alternative, the user may physically bring the cellular phone into a repair shop or to the cellular phone service provider to initiate the updating of the encryption key. As long as the cellular phone 1 and the HLR 2 are in communication with each other, the exact means by which the initiation of the dynamic update process occurs is not critical.

Upon initiation of the dynamic update process, messages containing necessary data to be verified and used in the dynamic update process are sent between the cellular phone 1 and the HLR 2. In the example illustrated in FIG. 1, since HLR 2 is shown to have made the determination that the dynamic update of the encryption key should be initiated, an authority request (AUTHREQ) message 10 is first sent from the HLR 2 to the cellular phone 1. The message 10 contains, as data fields, a random number (RAND #) 101 and a shared secret random data (SSD) 102. The process of generating the SSD 102 will be explained in further detail below, in connection with FIG. 2. Upon receipt of the message 10, the cellular phone 1 sends an acknowledgment message 20 to the HLR 10. Message 20 confirms receipt of the RAND # 101 and the SSD 102. The acknowledgment message 20 may contain simple acknowledgment data and/or the same data fields as those contained in the AUTHREQ message 10.

Continuing with the example illustrated in FIG. 1, the cellular phone 1 verifies whether the received SSD 102 matches the SSD calculated independently by the cellular phone. The process of independently calculating the SSD will be explained in further detail below, in connection with FIG. 2. Upon successful verification of the received SSD 102, an assignment report (ASREPORT) 30 containing SSD verification is sent. The message 30 may contain simple verification data and/or the same data fields as those contained in the AUTHREQ message 10. In the example shown in FIG. 1, since the cellular phone 1 is the recipient of the AUTHREQ message 10, the cellular phone 10 will send the ASREPORT message 30. Upon receipt of the ASREPORT message 30, the HLR 2 sends an update command message 40 to the cellular phone 1. Once the command message 40 has been fully received by the cellular phone 1, each component of the cellular phone network, i.e., the cellular phone 1 and the HLR 2, will dynamically update the encryption key by independent calculations which are described in further detail below, in connection with FIG. 2. Completion of the dynamic update process is confirmed by both the cellular phone 1 and the HLR 2 in a confirmation message 50 sent to the other. As mentioned previously, it should be understood that the above-described messages generated during the dynamic update process may be sent by either component of the cellular telephone network, depending upon which component initiated the dynamic update process.

Figure 2:
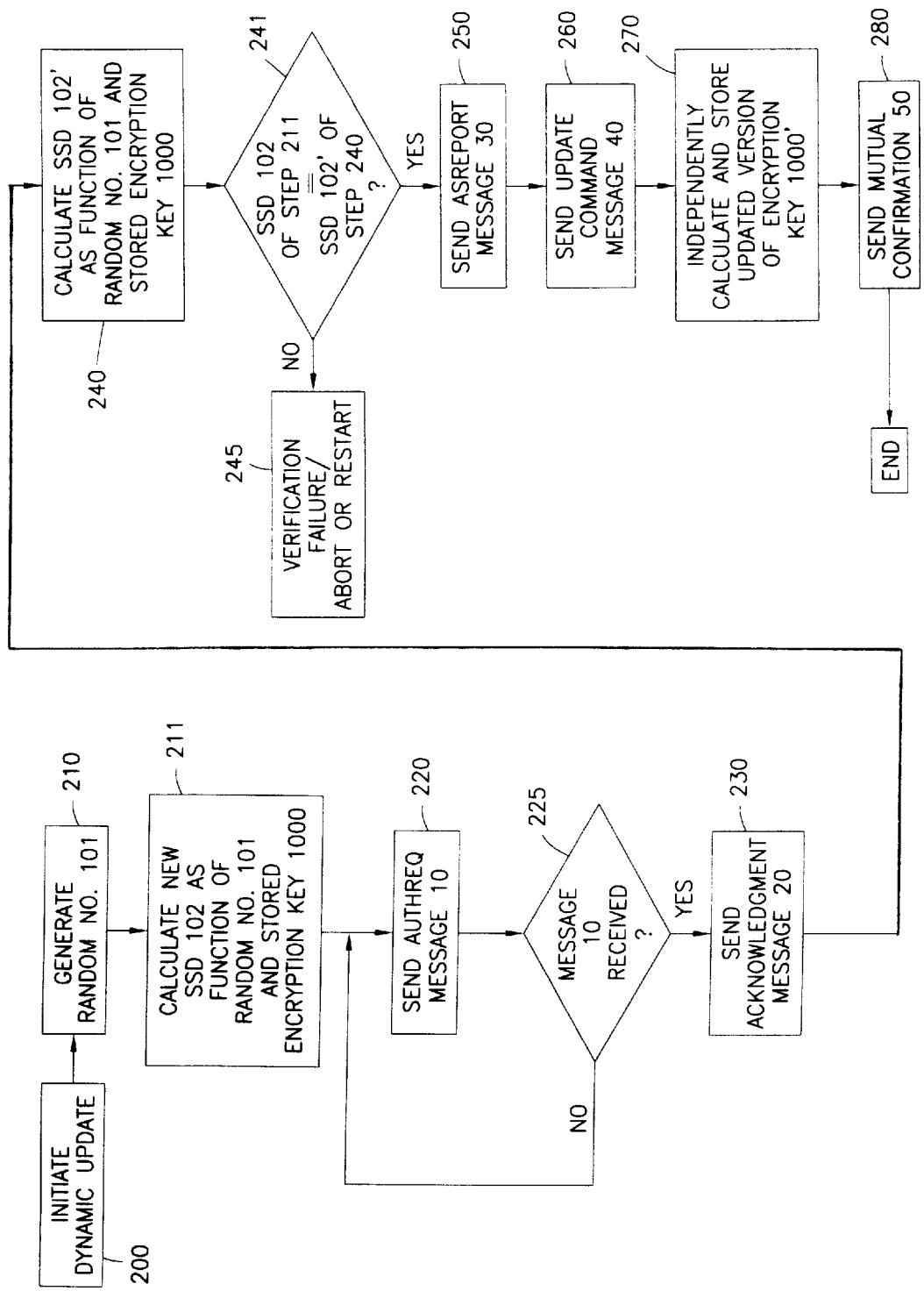
FIG. 2 is a detailed flow chart of a method, according to an embodiment of the present invention, for the dynamic update of cellular phone unique keys used for encryption, which flow chart illustrates the sequence of various messages generated during the dynamic update process.

Referring to FIG. 2, the steps of the dynamic updating of the cellular phone encryption key, and particularly the processes of generating the above-mentioned messages transmitted during the dynamic update process, will be explained in greater detail. In step 200, the initiation of the dynamic updating process is performed. As discussed above, either component of the cellular telephone network may initiate the update, and the steps illustrated in FIG. 2 are generic to the dynamic update process initiated by either the cellular phone 1 or the HLR 2. Once a determination has been made to begin the dynamic update process, which determination may be based on satisfaction of one or more of several conditions previously described, a random number (RAND #) 101 is generated in step 210, as previously mentioned. Random number generation may be accomplished by any suitable, known method, e.g., by a random number generation program. Next, in step 211, a shared secret random data (SSD) 102 is calculated using the generated random number 101. Calculation of the SSD 102 is based on an algorithm using the generated random number 101 and the previously stored version of the cellular phone unique encryption key 1000. The algorithm for calculating the SSD 102 as a function of the generated random number 101 and the previously stored version of the cellular phone unique encryption key 1000 may be any number-manipulating algorithm, but preferably is the Cellular Authentication and Voice Encryption (CAVE) algorithm, which is well known in the encryption field and need not be described here. The CAVE algorithm may be obtained from the TIA/EIA group (i.e., the Telecommunication Industry Association and the Electronic Industry Association).

Once the SSD 102 has been calculated, the AUTHREQ message 10 is sent by the update-initiating component of the cellular phone network in step 220. As discussed above, the AUTHREQ message 10 contains, as data fields, the generated random number 101 and the SSD 102 calculated by the update-initiating component. Upon receipt of the AUTHREQ message 10, the component of the cellular phone network that received the message 10 sends an acknowledgment message 20 in step 230 back to the originator of message 10. The acknowledgment message 20 informs the originator of the AUTHREQ message 10 that the AUTHREQ message 10 was properly received. As previously mentioned, the acknowledgment message 20 may contain simple acknowledgment data and/or the same data fields as those contained in the AUTHREQ message 10. If the AUTHREQ message 10 is not properly received by the intended recipient and no acknowledgment message 20 is generated within a specified time of sending the message 10, the AUTHREQ message 10 is resent as shown by the decision step 225. If the acknowledgment message 20 is received, the originator of the AUTHREQ message 10 next waits for independent verification of the SSD 102 by the recipient of the AUTHREQ message 10, which is explained below in further detail.

Upon sending the acknowledgment message 20, the recipient of the AUTHREQ message 10 uses the previously stored version of the cellular phone encryption key 1000 and at least a portion of the data fields contained in the message 10, i.e., the random number 101, to independently recalculate, or derive, the SSD. This is accomplished in step 240, in which a number-manipulating algorithm, e.g., the CAVE algorithm, is once again used to independently derive the SSD 102' based on the random number 101 contained in the message 10 and the previously stored version of the cellular phone encryption key 1000. Although the algorithm used in step 240 may be the same algorithm used in step 211, it is to be understood that the algorithms used by each component of the cellular telephone network need not be identical as long as the two algorithms produce the same SSD based on the random number 101 and the previously stored version of the cellular phone encryption key 1000. Next, in step 241, the independently derived SSD 102' is compared with the SSD 102 contained in the AUTHREQ message 10 for verification. Successful verification may be conditioned on exact matching of the two independently calculated versions of the SSD, or the verification may be considered successful if the two independently calculated versions of the SSD match within a pre-determined tolerance. If the verification result indicates that the two independently calculated versions of the SSD do not match, the dynamic update process may be restarted or aborted in step 245.

Following a successful verification of the matching of the two independently calculated versions of the SSD, the recipient of the AUTHREQ message 10 sends an ASREPORT message 30 in step 250 to confirm the SSD verification. The ASREPORT message 30 informs the update-initiating component of the cellular telephone network that the dynamic update process is continuing smoothly and confirms that both the cellular phone and the HLR have the necessary data fields to carry out the dynamic update of the cellular phone encryption key. The message 30 may contain simple verification data and/or the same data fields as those contained in the AUTHREQ message 10.

Once the ASREPORT message 30 has been received by the update-initiating component, the update-initiating component sends an update command message 40 in step 260. After sending the update command message 40, both the cellular phone 1 and the HLR 2 independently calculate and store a new, updated version of the cellular phone encryption key 1000' in step 270. Independent calculation of the updated version of the encryption key 1000' is dynamically accomplished by the cellular phone 1 and the HLR 2 based on a number manipulating algorithm, e.g., the CAVE algorithm, using the SSD and the previously stored version of the encryption key 1000. Once again, the cellular phone 1 and the HLR 2 may use different algorithms for generating the updated version of the encryption key 1000' as long as the two algorithms produce the identical result based on the SSD and the previously stored version of the encryption key. Furthermore, the algorithm used to generate the updated version of the encryption key 1000' may be different from the algorithm used to calculate the SSD. The cellular phone 1 and the HLR 2 each stores the updated version of the encryption key 1000' in its memory for future use in authentication, new dynamic updates, etc. Finally, the cellular phone 1 and the HLR 2 each sends in step 280 a confirmation message 50 to the other indicating that the update has been completed.

If at any point in the method of the present invention it is determined that a message is not received or a response is incorrect, different contingency responses may be implemented, some of which have been described above. Such contingencies may be the re-sending of the message after a specified time delay, a restart of the entire dynamic update procedure, or even notification of the cellular service provider and/or cellular phone user. For example, as shown in FIG. 2, if the AUTHREQ message 10 has not been received or a response sent within a specified time period the message may be resent. Further, if the acknowledgment message 20 or the ASREPORT message 30 contains information which is different than that which was sent in the AUTHREQ message 10, then the dynamic update procedure may be restarted. If several of these failures occur repeatedly, the cellular service provider and/or the cellular phone user may be notified and appropriate action taken.

As can be seen from the above, the method of the present invention allows for the dynamic update of the cellular phone encryption keys without requiring the updated encryption keys to be transmitted between the cellular phone and the associated HLR, thereby substantially eliminating the possibility of the updated encryption keys being intercepted. Accordingly, the method of the present invention severely limits the ability of thieves to perpetrate fraud on the cellular service provider and the cellular phone users. Furthermore, implementation of the method of the present invention requires no protocol change in the cellular telephone network.

In the foregoing description, the method of the present invention has been described with reference to a specific example. It is to be understood and expected that variations in the principles of the method herein disclosed may be made by one skilled in the art and it is intended that such modifications, changes, and substitutions are to be included within the scope of the present invention as set forth in the appended claims. The specification and the drawings are accordingly to be regarded in an illustrative rather than in a restrictive sense.

What is claimed is:

1. A method for dynamically updating a cellular-phone-unique-encryption key previously stored in, an common to, each of a cellular phone and an associated home location register for providing security in a cellular-phone-network operation involving said cellular phone and said associated home location register, comprising the steps of:

a) calculating, in one of said cellular phone and said home location register, a shared secret random data by means of a first number-manipulating algorithm using a random number and said previously stored cellular-phone-unique-encryption key;

b) transmitting a message comprising said random number and said shared secret random data from said one of said cellular phone and said home location register to other of said cellular phone and said home location register;

c) independently of said calculation in step a), calculating, in said other of said cellular phone and said home location register, said shared secret random data by means of a second number-manipulating algorithm using said transmitted random number and said previously stored cellular-phone-unique-encryption key; and d) calculating a new, common cellular-phone-unique-encryption key independently in said cellular phone and in said home location register, said one of said cellular phone and said home location register calculating said new cellular-phone-unique-encryption key by means of a third number-manipulating algorithm using said shared secret random data calculated in step a) and said previously stored cellular-phone-unique-encryption key, and said other of said cellular phone and said home location register calculating said new cellular-phone-unique-encryption key by means of a fourth number-manipulating algorithm using said shared secret random data independently calculated in step c) and said previously stored cellular-phone-unique-encryption key.

2. The method according to claim 1, further comprising a step of:

between steps c) and d), verifying by comparison, in said other of said cellular phone and said home location register, whether said shared secret random data calculated in step a) matches said shared secret random data independently calculated in step c).

3. A method for dynamically updating a cellular-phone-unique-encryption key previously stored in, and common to, each of a cellular phone and an associated home location register for providing security in a cellular-phone-network operation involving said cellular phone and said associated home location register, comprising the steps of:

a) calculating, in one of said cellular phone and said home location register, a shared secret random data by means of a first number-manipulating algorithm using a random number and said previously stored cellular-phone-unique-encryption key;

b) transmitting a message comprising said random number and said shared secret random data from said one of said cellular phone and said home location register to other of said cellular phone and said home location register;

c) independently of said calculation in step a), calculating, in said other of said cellular phone and said home location register, said shared secret random data by means of a second number-manipulating algorithm using said transmitted random number and said previously stored cellular-phone-unique-encryption key;

c') verifying by comparison, in said other of said cellular phone and said home location register, whether said shared secret random data calculated in step a) matches said shared secret random data independently calculated in step c);

c") transmitting a verification message, from said other of said cellular phone and said home location register to said one of said cellular phone and said home location register, if said shared secret random data calculated in step a) matches said shared secret random data independently calculated in step c); and d) calculating a new, common cellular-phone-unique-encryption key independently in said cellular phone and in said home location register, said one of said cellular phone and said home location register calculating said new cellular-phone-unique-encryption key by means of a third number-manipulating algorithm using said shared secret random data calculated in step a) and said previously stored cellular-phone-unique-encryption key, and said other of said cellular phone and said home location register calculating said new cellular-phone-unique-encryption key by means of a fourth number-manipulating algorithm using said shared secret random data independently calculated in step c) and said previously stored cellular-phone-unique-encryption key.

4. The method according to claim 3, further comprising the step of:

upon receipt of said verification message, said one of said cellular phone and said home location register transmitting an update-command message to said other of said cellular phone and said home location register to update said previously stored cellular-phone-unique-encryption key.

5. The method according to claim 4, further comprising the step of:

after step d), each of said cellular phone and said home location register transmitting to the other a confirmation message indicating completion of independent calculation of said new, common cellular-phone-unique-encryption key.

6. The method according to claim 5, wherein said first number-manipulating algorithm is a CAVE algorithm.

7. The method according to claim 6, wherein said first and second number-manipulating algorithms are identical.

8. The method according to claim 5, wherein said third number-manipulating algorithm is a CAVE algorithm.

9. The method according to claim 8, wherein said third and fourth number-manipulating algorithms are identical.

10. The method according to claim 2, wherein said first and second number-manipulating algorithms are a CAVE algorithm.

11. The method according to claim 2, wherein said third and fourth number-manipulating algorithms are a CAVE algorithm.

12. The method according to claim 2, wherein said method is initiated upon satisfaction of at least one of a plurality of conditions comprising a predetermined number of previous calls attempted, a predetermined number of unsuccessful attempts to authenticate authorization of said cellular telephone's use, and manual selection of initiation of said method.

13. A method for dynamically updating a cellular-phone-unique-encryption key previously stored in, and common to, each of a cellular phone and an associated home location register for providing security in a cellular-phone-network operation involving said cellular phone and said associated home location register, comprising the steps of:

a) calculating, in one of said cellular phone and said home location register, a shared secret random data by means of a first number-manipulating algorithm using a random number and said previously stored cellular-phone-unique-encryption key;

b) transmitting a message comprising said random number and said shared secret random data from said one of said cellular phone and said home location register to other of said cellular phone and said home location register;

c) independently of said calculation in step a), calculating, in said other of said cellular phone and said home location register, said shared secret random data by means of a second number-manipulating algorithm using said transmitted random number and said previously stored cellular-phone-unique-encryption key;

c') verifying by comparison, in said other of said cellular phone and said home location register, whether said shared secret random data calculated in step a) matches said shared secret random data independently calculated in step c);

c") transmitting a verification message, from said other of said cellular phone and said home location register to said one of said cellular phone and said home location register, if said shared secret random data calculated in step a) matches said shared secret random data independently calculated in step c); and d) calculating a new, common cellular-phone-unique-encryption key independently in said cellular phone and in said home location register, said one of said cellular phone and said home location register calculating said new cellular-phone-unique-encryption key by means of a third number-manipulating algorithm using said shared secret random data calculated in step a) and said previously stored cellular-phone-unique-encryption key, and said other of said cellular phone and said home location register calculating said new cellular-phone-unique-encryption key by means of a fourth number-manipulating algorithm using said shared secret random data independently calculated in step c) and said previously stored cellular-phone-unique-encryption key;

wherein said method is initiated upon satisfaction of at least one of a plurality of conditions comprising a predetermined number of previous calls attempted, a predetermined number of unsuccessful attempts to authenticate authorization of said cellular telephone's use, and manual selection of initiation of said method.

14. The method according to claim 13, further comprising the step of:

upon receipt of said verification message, said one of said cellular phone and said home location register transmitting an update-command message to said other of said cellular phone and said home location register to update said previously stored cellular-phone-unique-encryption key.

15. The method according to claim 14, further comprising the step of:

after step d), each of said cellular phone and said home location register transmitting to the other a confirmation message indicating completion of independent calculation of said new, common cellular-phone-unique-encryption key.

16. The method according to claim 15, wherein said first and second number-manipulating algorithms are a CAVE algorithm.

17. The method according to claim 15, wherein said third and fourth number-manipulating algorithms are a CAVE algorithm.

18. A method for updating a cellular-phone-unique-encryption key previously stored in, and common to, each of a cellular phone and an associated home location register of a cellular-phone network without transmitting an updated cellular-phone-unique-encryption key between said cellular phone and said home location register, comprising the steps of:

a) generating, in one of said cellular phone and said home location register, a check message comprising a first check element and a second check element, said second check element being generated by means of a first number-manipulating algorithm using said first check element and said previously stored cellular-phone-unique-encryption key;

b) transmitting said check message from said one of said cellular phone and said home location register to other of said cellular phone and said home location register;

c) independently of said generation of said check message in step a), generating, in said other of said cellular phone and said home location register, said second check element by means of a second number-manipulating algorithm using said first check element and said previously stored cellular-phone-unique-encryption key;

d) determining, in said other of said cellular phone and said home location register, whether said second check element of said check message transmitted in step b) matches said second check element independently generated in step c); and e) generating a new, common cellular-phone-unique-encryption key independently in said cellular phone and in said home location register, said one of said cellular phone and said home location register generating said new cellular-phone-unique-encryption key by means of a third number-manipulating algorithm using said second check element generated in step a) and said previously stored cellular-phone-unique-encryption key, and said other of said cellular phone and said home location register generating said new cellular-phone-unique-encryption key by means of a fourth number-manipulating algorithm using said second check element independently generated in step c) and said previously stored cellular-phone-unique-encryption key.

19. The method according to claim 18, wherein said method is initiated upon satisfaction of at least one of a plurality of conditions comprising a predetermined number of previous calls attempted, a predetermined number of unsuccessful attempts to authenticate authorization of said cellular telephone's use, and manual selection of initiation of said method.

20. The method according to claim 19, wherein said first check element is a random number.

21. The method according to claim 20, wherein said first and second number-manipulating algorithms are a CAVE algorithm.

22. A method for updating a cellular-phone-unique-encryption key previously stored in, and common to, each of a cellular phone and an associated home location register of a cellular-phone network without transmitting an updated cellular-phone-unique-encryption key between said cellular phone and said home location register, comprising the steps of:

a) generating, in one of said cellular phone and said home location register, a check message comprising a first check element and a second check element, said second check element being generated by means of a first number-manipulating algorithm using said first check element and said previously stored cellular-phone-unique-encryption key;

b) transmitting said check message from said one of said cellular phone and said home location register to other of said cellular phone and said home location register;

c) independently of said generation of said check message in step a), generating, in said other of said cellular phone and said home location register, said second check element by means of a second number-manipulating algorithm using said first check element and said previously stored cellular-phone-unique-encryption key;

d) determining, in said other of said cellular phone and said home location register, whether said second check element of said check message transmitted in step b) matches said second check element independently generated in step c);

d') transmitting a verification message, from said other of said cellular phone and said home location register to said one of said cellular phone and said home location register, if said second check element of said check message transmitted in step b) matches said second check element independently generated in step c); and e) generating a new, common cellular-phone-unique-encryption key independently in said cellular phone and in said home location register, said one of said cellular phone and said home location register generating said new cellular-phone-unique-encryption key by means of a third number-manipulating algorithm using said second check element generated in step a) and said previously stored cellular-phone-uniqueencryption key, and said other of said cellular phone and said home location register generating said new cellular-phone-unique-encryption key by means of a fourth number-manipulating algorithm using said second check element independently generated in step c) and said previously stored cellular-phone-unique-encryption key;

wherein said method is initiated upon satisfaction of at least one of a plurality of conditions comprising a predetermined number of previous calls attempted, a predetermined number of unsuccessful attempts to authenticate authorization of said cellular telephone's use, and manual selection of initiation of said method, wherein said first check element is a random number, and wherein said first and second number-manipulating algorithms are a CAVE algorithm.

23. The method according to claim 22, further comprising the step of:

upon receipt of said verification message, said one of said cellular phone and said home location register transmitting an update-command message to said other of said cellular phone and said home location register to update said previously stored cellular-phone-unique-encryption key.

24. The method according to claim 20, wherein said third and fourth number-manipulating algorithms are a CAVE algorithm.

25. A method for updating a cellular-phone-unique-encryption key previously stored in, and common to, each of a cellular phone and an associated home location register of a cellular-phone network without transmitting an undated cellular-phone-unique-encryption key between said cellular phone and said home location register, comprising the steps of:

a) generating, in one of said cellular phone and said home location register, a check message comprising a first check element and a second check element, said second check element being generated by means of a first number-manipulating algorithm using said first check element and said previously stored cellular-phone-unique-encryption key;

b) transmitting said check message from said one of said cellular phone and said home location register to other of said cellular phone and said home location register;

c) independently of said generation of said check message in step a), generating, in said other of said cellular phone and said home location register, said second check element by means of a second number-manipulating algorithm using said first check element and said previously stored cellular-phone-unique-encryption key;

d) determining, in said other of said cellular phone and said home location resister, whether said second check element of said check message transmitted in step b) matches said second check element independently generated in step c);

d') transmitting a verification message, from said other of said cellular phone and said home location register to said one of said cellular phone and said home location register, if said second check element of said check message transmitted in step b) matches said second check element independently generated in step c); and e) generating a new, common cellular-phone-unique-encryption key independently in said cellular phone and in said home location register, said one of said cellular phone and said home location register generating said new cellular-phone-unique-encryption key by means of a third number-manipulating algorithm using said second check element generated in step a) and said previously stored cellular-phone-unique-encryption key, and said other of said cellular phone and said home location register generating said new cellular-phone-unique-encryption key by means of a fourth number-manipulating algorithm using said second check element independently generated in step c) and said previously stored cellular-phone-unique-encryption key;

wherein said method is initiated upon satisfaction of at least one of a plurality of conditions comprising a predetermined number of previous calls attempted, a predetermined number of unsuccessful attempts to authenticate authorization of said cellular telephone's use, and manual selection of initiation of said method, wherein said first check element is a random number, and wherein said third and fourth number-manipulating algorithms are a CAVE algorithm.

26. The method according to claim 25, further comprising the step of:

upon receipt of said verification message, said one of said cellular phone and said home location register transmitting an update-command message to said other of said cellular phone and said home location register to update said previously stored cellular-phone-unique-encryption key.

* * * * *

UNITED STATES PATENT AND TRADEMARK OFFICE
CERTIFICATE OF CORRECTION

PATENT No. : 5,991,405

ISSUE DATE : November 23, 1999

INVENTOR(S): MILLS, K.

It is certified that error appears in the above-identified patent and that said Letters Patent is hereby corrected as shown below:

In column 8, line 31, change "an" to --and--.

In column 13, line 32, change "undated" to --updated--.

Signed and Sealed this

Twenty-seventh Day of March, 2001

*Attest:*

NICHOLAS P. GODICI

*Attesting Officer*     *Acting Director of the United States Patent and Trademark Office*